United States Patent
Drevet et al.

(10) Patent No.: US 12,377,645 B2
(45) Date of Patent: *Aug. 5, 2025

(54) COMPOSITE PANELS AND METHODS FOR MAKING THE SAME

(71) Applicant: Columbia Insurance Company, Omaha, NE (US)

(72) Inventors: Anthony Drevet, Chattanooga, TN (US); Philippe Erramuzpe, Augusta, GA (US); Shawn Liao, Taichung (TW); Felix Herrera, Shanghai (CN)

(73) Assignee: Columbia Insurance Company, Omaha, NE (US)

( * ) Notice: Subject to any disclaimer, the term of this patent is extended or adjusted under 35 U.S.C. 154(b) by 8 days.

This patent is subject to a terminal disclaimer.

(21) Appl. No.: 18/140,217

(22) Filed: Apr. 27, 2023

(65) Prior Publication Data

US 2023/0330980 A1 Oct. 19, 2023

Related U.S. Application Data

(63) Continuation of application No. 17/236,571, filed on Apr. 21, 2021, now Pat. No. 11,794,459, which is a
(Continued)

(51) Int. Cl.
*B32B 29/06* (2006.01)
*B32B 7/12* (2006.01)
(Continued)

(52) U.S. Cl.
CPC ............... *B32B 29/06* (2013.01); *B32B 7/12* (2013.01); *B32B 29/005* (2013.01); *B32B 29/04* (2013.01);
(Continued)

(58) Field of Classification Search
CPC ......... B32B 7/12; B32B 29/005; B32B 29/04; B32B 29/06; B32B 2260/028;
(Continued)

(56) References Cited

U.S. PATENT DOCUMENTS 6,440,538 B1 8/2002 Ungar
2004/0086678 A1* 5/2004 Chen .................... B44C 5/0461
428/44

(Continued)

FOREIGN PATENT DOCUMENTS

CN 201539080 U 8/2010
CN 106968413 A * 7/2017
(Continued)

OTHER PUBLICATIONS

Machine Translation of CN-106968413-A (Year: 2017).*
Machine Translation of CN-106517837-B (Year: 2018).*
Machine Translation of CN 201539080 U (Year: 2015).

*Primary Examiner* — Mark Ruthkosky
*Assistant Examiner* — Sathavaram I Reddy
(74) *Attorney, Agent, or Firm* — Miller & Martin PLLC

(57) ABSTRACT

The disclosed panels generally comprise a protective layer composed of a paper impregnated with a melamine resin. The protective layer may be incorporated into a panel comprising a rigid composite core, such as a plastic composite core or a mineral composite core. Disclosed are also methods for manufacturing the panels.

28 Claims, 9 Drawing Sheets

Related U.S. Application Data continuation-in-part of application No. 16/580,668, filed on Sep. 24, 2019, now Pat. No. 12,109,790.

(60) Provisional application No. 63/018,300, filed on Apr. 30, 2020, provisional application No. 63/013,953, filed on Apr. 22, 2020, provisional application No. 62/735,607, filed on Sep. 24, 2018.

(51) Int. Cl.
*B32B 29/00* (2006.01)
*B32B 29/04* (2006.01)

(52) U.S. Cl.
CPC ... *B32B 2260/028* (2013.01); *B32B 2260/046* (2013.01); *B32B 2262/101* (2013.01); *B32B 2264/10* (2013.01); *B32B 2264/12* (2013.01); *B32B 2307/546* (2013.01); *B32B 2307/726* (2013.01); *B32B 2307/732* (2013.01); *B32B 2607/00* (2013.01)

(58) Field of Classification Search
CPC ........ B32B 2260/046; B32B 2262/101; B32B 2264/10; B32B 2264/12; B32B 2307/546; B32B 2307/726; B32B 2307/732; B32B 2607/00

See application file for complete search history.

(56) References Cited

U.S. PATENT DOCUMENTS

2006/0032175 A1 2/2006 Chen et al.
2014/0261954 A1* 9/2014 Dubey ............... B28B 19/0015
156/45

FOREIGN PATENT DOCUMENTS

CN 106517837 B * 10/2018 ............... C04B 9/02
WO WO-2018068197 A1 * 4/2018 ........... B29C 39/003

* cited by examiner

COMPOSITE PANELS AND METHODS FOR MAKING THE SAME

CROSS-REFERENCE TO RELATED APPLICATIONS

This application titled "Composite Panels and Methods for Making the Same" is a continuation of and claims a benefit of priority to U.S. patent application Ser. No. 17/236,571 filed Apr. 21, 2021, which is a continuation-in-part application claiming the benefit to U.S. patent application Ser. No. 16/580,668 filed Sep. 24, 2019 titled "Composite Panels Having a Melamine Impregnated Protective Layer," which claims the benefit of Provisional Application No. 62/735,607 filed Sep. 24, 2018 and titled "Solid Polymer-Based or Mineral-Based Core Flooring and Wall Panel Having Melamine Impregnated Paper Wear layer," each of which is hereby incorporated by reference in its entirety as if set forth below. U.S. patent application Ser. No. 16/580,668 also claims priority to Provisional Application No. 63/013,953 filed Apr. 22, 2020 titled "Composite Panel" and Provisional Application No. 63/018,300 filed Apr. 30, 2020 titled "Composite Panel."

TECHNICAL FIELD

Embodiments of the presently disclosed technology relate to new and improved flooring planks, wall coverings, or other decorative panels, and more particularly flooring planks, wall coverings, or other decorative panels comprising a melamine-impregnated protective layer bonded to a composite core, such as a plastic composite core or a mineral composite core.

BACKGROUND

Ceramic or porcelain tiles and planks are widely used as floor coverings because of their waterproof properties and superior surface durability. However, one disadvantage of traditional ceramic or porcelain tiles and planks is installation often takes several days and can be a messy process due to the use of adhesive, mortar, and grout. Satisfactory installation often requires a competent professional installer and the removal process can be very disruptive and costly.

While there have been attempts to simplify the installation method for ceramic and porcelain tiles and planks, such as that described in U.S. Pat. No. 8,631,624, experience in the field has demonstrated that those products are not performing satisfactorily. Generally, such alternate methods require installing the ceramic tiles without the use of glue and often without grout as well; however, ceramic tiles produced using these methods tend to be brittle and crack over time over, especially if installed over an uneven subfloor.

The disadvantages described above are among the reasons why thermoplastic-based or polymer-based flooring, and particularly polyvinylchloride flooring, are greatly appreciated by the end user. Several types of thermoplastic flooring already exist on the market, such as products commonly known as vinyl flooring, LVP/LVT flooring, WPC, and the like. Such types of flooring bring additional features such as higher rigidity, sound reduction, and better footstep comfort when compared to ceramic or porcelain tiles in addition to waterproofing and ease of assembly.

The visual appeal of thermoplastic-based alternatives to ceramic and porcelain tiles has been improved by use of embossed-in-register technology, deeper beveling, the use of high-resolution printed images, and efforts to lower gloss, but almost all thermoplastic flooring products on the market continue to use a plastic-based protective layer. This protective layer is generally made of polyvinyl chloride, but some alternative protective layers are made utilizing polyethylene terephthalate, polyurethane, or polypropylene. The core, décor layer, and the protective layer are generally made of the same type of polymer and fused together through a thermo-bonding process.

Plastic protective layers can be unattractive. Indeed, when a plastic protective layer is employed, the surface of the finished product tends to have a slightly dull appearance and what is commonly called in the flooring industry a "plastic look." In contrast, ceramic and porcelain tiles are said to have a much more aesthetically pleasing, "natural" appearance.

To improve the surface durability of those thermoplastic-based flooring products, a finish is generally applied on top of the plastic protective layer. This finish is, in most cases, a urethane coating which comprises corundum, silicone dioxide particles, ceramic beam, or diamond particles. However, the effects of such coatings are limited, and only serve to slightly improve the micro-scratch resistance of the surface.

Thus, there remains a need for an improved flooring product that is substantially waterproof, easy to install, has improved scratch resistance, yet presents a durable and pleasing "natural" look and feel. Likewise, there remains a need for a process by which such an improved flooring product may be easily and inexpensively manufactured. Embodiments of the presently disclosed technology are directed to these and other considerations.

SUMMARY

Embodiments of the presently disclosed technology include a panel comprising a protective layer formed of a paper impregnated with a melamine resin, a décor layer comprising a thermoplastic film, the décor layer disposed below the protective layer, an adhesive layer bonding an upper surface of the décor layer to a lower surface of the protective layer, and a rigid core comprising a primary component and a secondary component and disposed below the décor layer.

In some embodiments, the protective layer can comprise abrasion-resistant particles (e.g., aluminum oxide, silicon dioxide, ceramic beam, diamond particles, or a combination thereof).

In some embodiments, the protective layer is substantially transparent. In some embodiments, the protective layer has a weight of from 30 g/m$^2$ to about 150 g/m$^2$.

In some embodiments, wherein the thermoplastic film of the décor layer is selected from the group consisting of poly-vinyl chloride, polyethylene, polypropylene, polyurethane, or a combination thereof. In some embodiments, the décor layer is laminated to an upper surface of the core.

In some embodiments, the primary component of the core comprises one of a thermoplastic or an inorganic compound and the secondary component comprises calcium carbonate, kaolin, wallasonite, calcium silicate, or a combination thereof. In some embodiments, the core further comprises wood fibers in the amount of 30% or less by weight of the core. In some embodiments, the core comprises about 25% to about 45% polyvinylchloride and from about 45% to about 65% calcium carbonate. In some embodiments, the core comprises about 40% to about 55% magnesium oxide and about 20% to about 25% magnesium salt, such as magnesium chloride or magnesium sulfate.

In some embodiments, the panel has a deep scratch resistance as measured by ISO 1518 of 20N to 30N.

In some embodiments, the panel further comprises an edge locking system.

Embodiments of the presently disclosed technology include a panel comprising a protective layer comprising a paper impregnated with a melamine resin and an adhesive, the melamine resin further comprising abrasion-resistant particles; a décor layer comprising a thermoplastic film, the décor layer disposed below and bonded to the protective layer; and a rigid core layer, the rigid core layer comprising a primary component and a secondary component and disposed below the décor layer.

In some embodiments, wherein the protective layer comprises a top surface of the panel, and has a top surface having a hardness of at least 70 shore D.

In some embodiments, the adhesive is selected from the group of polyurethane, polyester, polyethylene, ethyl vinyl acetate, nylon, polyolefin, polyvinyl acetate, acrylic, urethane. In some embodiments, the adhesive is a melted film.

In some embodiments, the core can be produced by extrusion, calendaring, continuous process or a combination of these.

Embodiments of the presently disclosed technology include a panel comprising a protective layer formed of a décor paper impregnated with a melamine resin, an adhesive layer bonding an upper surface of the core to a lower surface of the protective layer, and a rigid core layer comprising a primary component and a secondary component and disposed below the protective layer.

Embodiments of the present disclosure also may include a composite panel comprising a rigid core comprising magnesium oxide, magnesium salt, and fibers. The composite panel may also include a décor layer adhered to the rigid core and composed of a paper impregnated with a melamine resin and comprising abrasion-resistant particles. The composite panel may also include a balancing layer composed of a paper impregnated with a melamine resin, the balancing layer disposed below the rigid core.

In some embodiments, the composite panel may further comprise a cushioning layer disposed below the balancing layer.

In some embodiments, the rigid core may have a composition comprising of: (i) 34-36% by weight of magnesium oxide; (ii) 16-18% by weight of magnesium chloride; and (iii) 28-32% by weight of plant fibers. In some example embodiments, the rigid core may include synthetic or polymer fibers in addition to or instead of the plant fibers. In some embodiments, the rigid core may further comprise other optional material, for example, perlite, bentonite, etc.

In some embodiments, the rigid core may have a coefficient of expansion of less than 0.05% when subjected to temperatures ranging from 10° C. to 50° C.

In some embodiments, the rigid core may have a flexural strength of greater than or equal to 200N when measured according to ASTM D1037.

In some embodiments, the rigid core may have a thickness of from about 3 mm to about 15 mm.

In some embodiments, the magnesium salt may be selected from the group consisting of magnesium chloride and magnesium sulfate.

In some embodiments, the bond strength between the décor layer and the rigid core may be approximately 30 N/mm$^2$ when measured according to ASTM D903.

In some embodiments, the dimensional stability of the composite panel may be between 0.1% and 0.25% when heated to a temperature of about 70° C. for 6 hours and then cooled to ambient temperature.

In some embodiments, the décor layer and the balancing layer may be adhered to the rigid core via a thermal lamination process at a temperature of from about 175° C. to about 210° C. and a pressure of from about 15 mPa to about 25 mPa.

In some embodiments, the content of melamine resin in the décor layer is from 30 g/m$^2$ to 180 g/m$^2$.

In some embodiments, the décor layer may be further impregnated with an adhesive.

In some embodiments, the composite panel is one of a wall panel, a ceiling panel, or a floor panel.

In some embodiments, the composite panel may be profiled with an edge locking system.

In some embodiments, the composite panel may further comprise a bevel disposed along an edge of the composite panel.

In some embodiments, the water absorption percentage of the composite panel may be less than or equal to 10% when measured according to ASTM D570.

Embodiments of the present disclosure may comprise a protective layer composed of a paper impregnated with a melamine resin, a décor layer disposed below the protective layer; and a rigid core comprising magnesium oxide, magnesium salt, and fibers. The protective layer and the décor layer can be directly laminated to the rigid core.

In some embodiments, direct lamination can be performed at a temperature of from about 175° C. to about 210° C. and a pressure of from about 15 mPa to about 25 mPa.

In some embodiments, the protective layer can be further impregnated with an adhesive.

In some other example embodiments, the décor layer, the protective layer or the balancing layer may be attached to the rigid core by a cold press/lamination process. That is, the décor layer, the protective layer and/or the balancing layer may be attached to the rigid core without the use of high temperatures to press said layers to the rigid core. In the cold press process, an adhesive is provided either on the top surface of the rigid core and/or on the bottom of the overlay (combination of at least décor layer and protective layer), and said layers are pressed together with the rigid core using pressure ranging from 16-22 MPa (in most cases about 20 MPa) for at least 6 hours and in most cases at least 12 hours or more. Alternatively, the cold process may use a two-part adhesive, where a first adhesive is disposed below the overlay and a second adhesive is disposed above the rigid core. The first adhesive and the second adhesive may or may not be similar. Then, the overlay and the rigid core are pressed together under pressure (16-22 MPa) for at least 12 hours. The first and the second adhesives will form a bond under pressure to attach the overlay to the rigid core. In the cold press process, heat is not used to laminate the layers to the rigid core.

BRIEF DESCRIPTION OF THE DRAWINGS

The particular features and advantages of the presently disclosed technology as well as other objects will become apparent from the following description taken in connection with the accompanying drawings in which.

DETAILED DESCRIPTION

Figure 1:
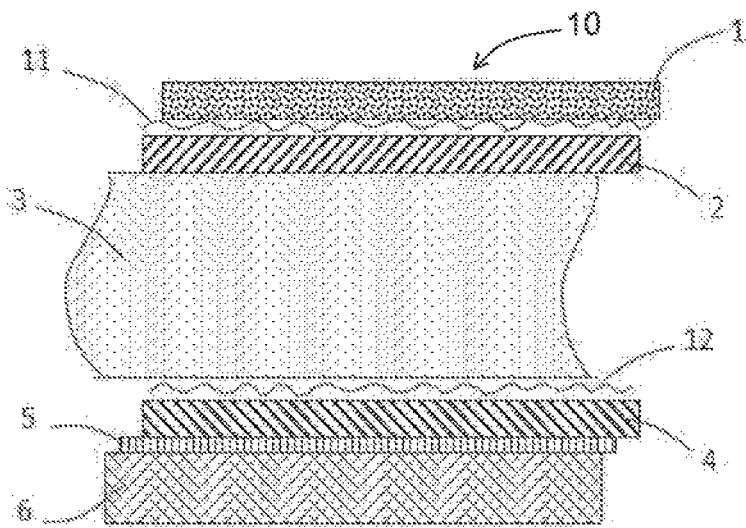
FIG. 1 is a cross-sectional view of a first embodiment of a panel according to the present disclosure, the panel comprising a waterproof solid polymer-based or mineral-based core and a protective layer comprising a melamine-impregnated paper.

Embodiments of the presently disclosed technology include new and improved flooring planks, wall coverings, or decorative panels comprising a melamine-impregnated protective layer bonded to a composite core.

As used throughout this disclosure, the term "panel" is intended to reference some or all of at least flooring planks, wall coverings, or other decorative panels and is not intended to limit the scope of this disclosure. Normal usage of the presently disclosed panels may occur in a variety of locations including, but not limited to, residences (e.g., living areas, bathrooms, kitchens, basements), commercial spaces, offices, gyms, studios, or stores. While reference throughout this disclosure is made expressly to panels, it is understood that the embodiments of the present disclosure may be useful in other applications.

As used herein, a "plastic composite core" may refer to a core having a plastic component and an inorganic component. In some embodiments, the composite core may comprise at least 20% by weight of a plastic (e.g., polyvinyl chloride (PVC), polyethylene (PE), polyethylene terephthalate (PET), polyurethane (PU), ethylene vinyl acetate (EVA), ABS, and polypropylene (PP)), and a filler (e.g. calcium carbonate, kaolin, wallasonite, calcium silicate, or a combination thereof). It is understood that the type of filler and plastic can vary greatly depending on design needs. The inorganic component may comprise fiber cement, gypsum, plaster, magnesium oxide, or other cements or concretes, such as magnesium oxychloride cements. As used herein, a "mineral composite core" includes an inorganic compound and a filler. In embodiments where the composite core is a mineral composite core, the composite core may contain about 0 to 30% by weight of wood fibers and in an example embodiment, about 8% by weight of wood fibers.

In the past, it has been challenging to use a protective layer including melamine resin on top of a non-wood-based core, such as a composite core (e.g., a primarily polymer-based or mineral-based core having less than about 20% by weight of wood fibers) because:

(a) traditional melamine resins used for wood-based panels do not adhere well to non-wood-based panels; and (b) melamine resins require high temperatures to cure, but polymer-based panels are sensitive to temperature.

Some attempts have been made to use a melamine resin protective layer on top of a polymer-based core, such as described in U.S. Pat. Nos. 9,611,659 and 9,745,758. However, in those patents, the top layer comprises several layers of impregnated paper (commonly called "HPL" or "High Pressure Laminate"). The use of HPL makes the fabrication process slow and expensive. Additionally, both during the manufacturing process and as a finished product, HPLs are known to undergo significant structural changes in reaction to changes in the environment, such as changes in temperature and/or humidity, due to the relatively large quantity of resin and paper used in those processes.

Embodiments of the presently disclosed technology include a panel with high surface durability with a natural look and feel, and a core suitable to be profiled with a locking system to make installation and disassembly easy, fast, and clean. For instance, the panels show increased durability through surface micro-scratch resistance, deep scratch resistance, and heat resistance. Due to the manufacturing processes discussed below, it is possible to manufacture a panel with a composite core and having a single layer of melamine-impregnated paper as a protective layer. As discussed in more detail below, in some embodiments, the protective layer may include embossing to provide texture to the plank and provide a natural look and feel.

Figure 12:
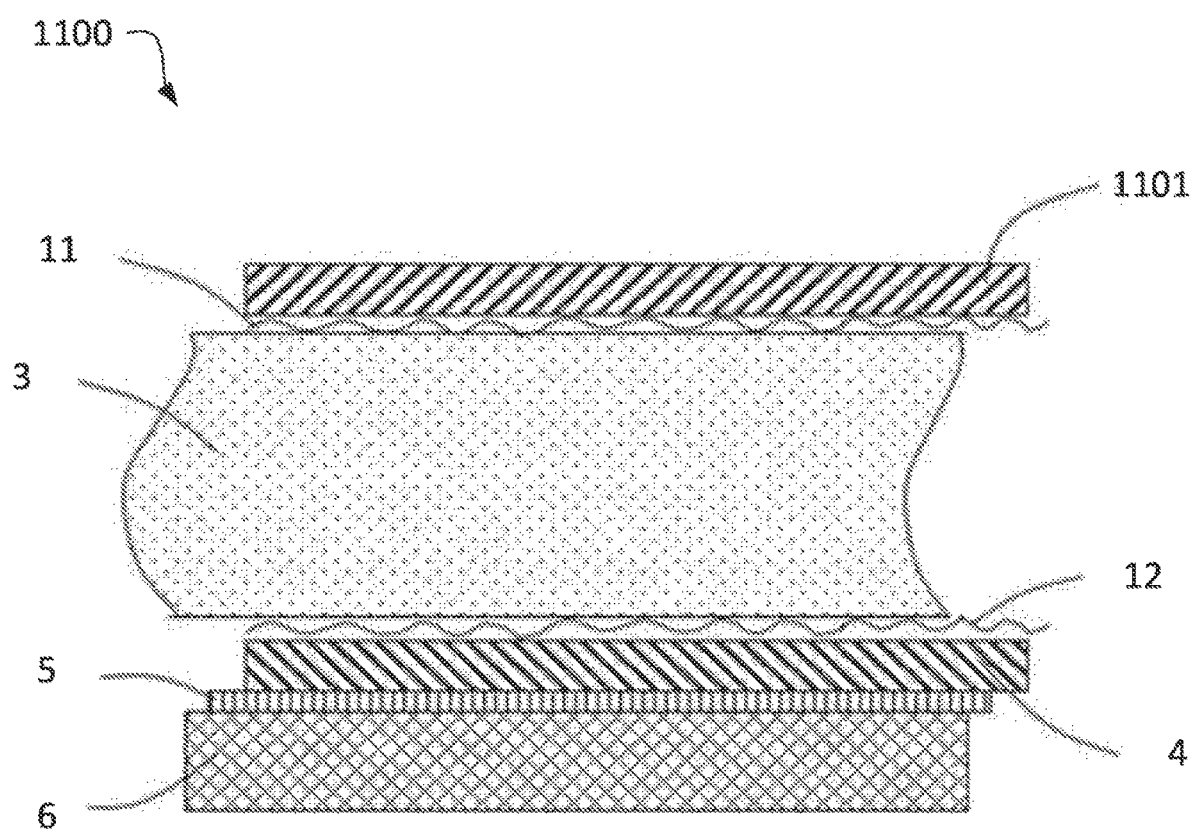
FIG. 12 is a cross-sectional view of an eighth embodiment of a panel according to the present disclosure.
Figure 13:
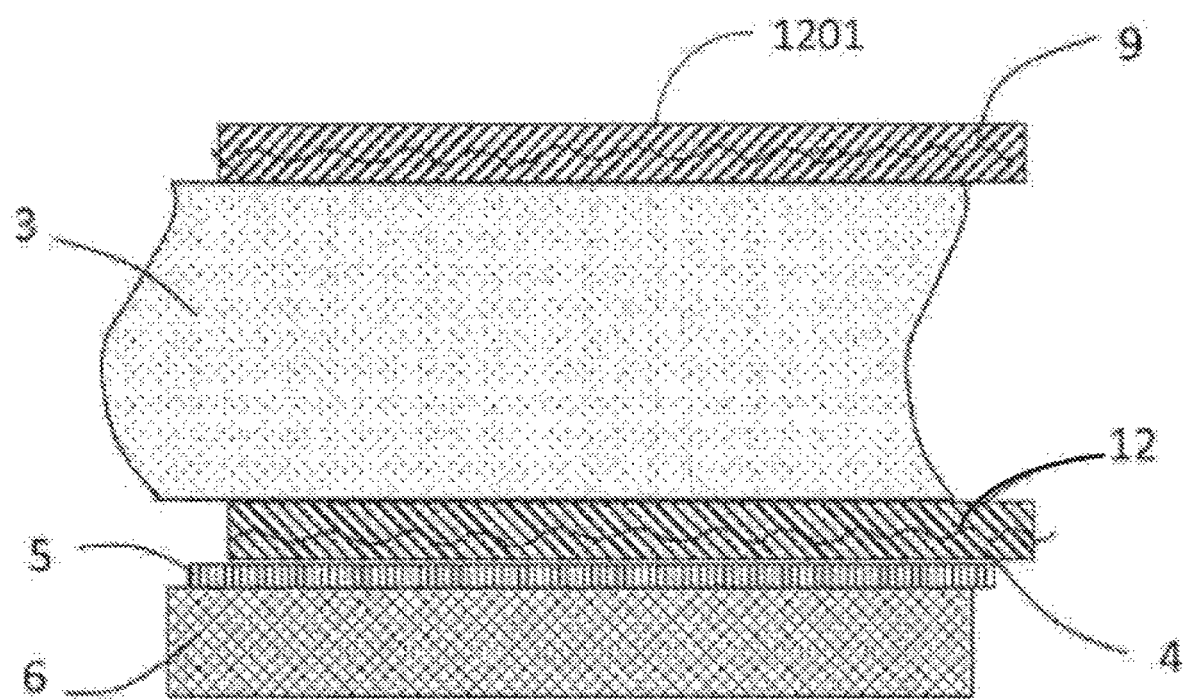
FIG. 13 is a cross-sectional view of a ninth embodiment of a panel according to the present disclosure.

FIGS. 1-9 and 12-13 illustrate various example embodiments of panels comprising a plurality of layers. In some embodiments, as illustrated in FIGS. 1-9, this plurality of layers can generally comprise a protective layer, a décor layer, and a core. In some embodiments, as illustrated in FIGS. 12-13, the plurality of layers can generally comprise a combined protective layer and décor layer, and a core.

However, as discussed in greater detail below, the panels can include various other types of layers serving a variety of purposes.

As used herein, the term "protective layer" may refer to a layer providing protection against wear caused by normal usage of the planks, including but not limited to abrasion-resistance, scratch-resistance, and/or water-proofing. In some embodiments, the protective layer can comprise a paper impregnated with melamine resin. In other embodiments, the protective layer can be a combined décor layer and protective layer, in which a décor layer is impregnated with melamine resin. In some embodiments, the paper or décor layer can be impregnated with the melamine resin by the manufacturing processes described in FIGS. 8A-10.

In some embodiments, the paper used in the protective layer can be a transparent paper. In some embodiments, the paper can have a weight of from 15 g/m² to 70 g/m², and more specifically from 45 g/m² to 58 g/m². In some embodiments, the paper can be impregnated with a melamine resin such that the final weight of the protective layer can be from 30 g/m² to 150 g/m² depending on the starting weight of the paper. After impregnation with the resin, the protective layer can be substantially transparent due to the transparency of the resin, the thinness and weight of the paper, and the amount of cellulose fibers contained in the paper.

In embodiments utilizing a combined décor layer and protective layer, the décor layer can comprise a décor paper having a weight of from 60 g/m² to 80 g/m² and in an example embodiment, a weight of around 75 g/m². In some embodiments, the décor paper can be impregnated with a melamine resin in an amount of about 1 to 3 times the paper weight.

In some embodiments, the protective layer may additionally comprise abrasion-resistant particles (e.g., aluminum oxide, silicon dioxide, ceramic beam, and diamond particles) that may resist wear and tear during normal usage of the panels. In embodiments where abrasion-resistant particles are used, the protective layer can contain from about 15 g/m² to about 100 g/m² abrasion-resistant particles. In some embodiments, the protective layer can contain from about 20 g/m² to about 50 g/m² abrasion-resistant particles, about 25 g/m² to about 50 g/m² abrasion-resistant particles, about 30 g/m² to about 50 g/m² abrasion-resistant particles, about 40 g/m² to about 50 g/m² abrasion-resistant particles.

In embodiments incorporating a separate décor layer, to improve the clarity of the décor layer beneath, it may be preferable to use a lightweight paper having relatively less cellulosic fibers to be more transparent. However, lighter-weight papers contain less hard or abrasion-resistant particles diminishing the wear and scratch-resistance of the finished product. Thus, in an example embodiment incorporating a lighter-weight paper (e.g., a paper having a weight of about 25 g/m²), a polyurethane adhesive containing hard particles can be used to bond the décor layer to the core. Those skilled in the art would understand that the protective layer can be substantially transparent because it is made of a thin paper and the resin used is transparent.

The protective layer can be bonded either directly or indirectly to the core. In some embodiments, the protective layer may be bonded to an additional layer (e.g., a décor layer or an upper sublayer). For instance, the protective layer can be bonded using an adhesive (e.g., PU, polyester, PE, EVA, nylon, polyolefin, PVA, acrylic, urethane). In some embodiments, the protective layer can be bonded to the core via a lamination process, such as cold or hot pressing.

In some embodiments, the panels can comprise a composite core such as a plastic composite core or a mineral composite core. For instance, the core can comprise a primary component and a secondary component. In embodiments comprising a plastic composite core, the primary component can be a thermoplastic material. Suitable thermoplastic materials can include PVC, PP, PE, EVA, PET, PU, or a combination thereof. In embodiments where the core is a mineral composite core, the primary component may be a mineral-based material. Suitable mineral-based materials can include calcium silicate, fiber cement, magnesium oxide, magnesium chloride, magnesium sulfate, gypsum, fired or unfired clay, or a combination thereof. In some embodiments, the primary component can be present in an amount of from about 10 to about 30% by weight, about 10 to about 15% by weight, about 15 to about 20% by weight, about 20% to about 25% by weight, and about 25% to about 30% by weight.

In some embodiments, the secondary component can be a filler, such as calcium carbonate, kaolin, wallasonite, calcium silicate, fly ash, or a combination thereof. In some embodiments, the secondary component can be present in an amount of from about 30 to about 70% by weight, about 35% to about 65% by weight, about 40% to about 60% by weight, about 45% to about 55% by weight, and about 50% to about 65% by weight.

In some embodiments, the core can comprise a minimal amount of wood-based or natural-fiber based component in an amount of from about 0% to about 30%, about 5% to about 10%, about 10% to about 30%, about 15% to about 20%, or about 20% to about 30%. For instance, in an example embodiment discussed in greater detail in EXAMPLE 1, the wood-based or natural-fiber based component may be present in the core an amount of approximately 28-32%. In some embodiments, the amount of wood-based material can be from about 20% to about 50%, and for example, about 20%, about 25%, about 30%, about 35%, about 40%, about 45%, or about 50%. The wood-based or natural-fiber based material may comprise any type of wood or natural fibers known in the art. In other embodiments, the core may comprise a synthetic fiber material or a combination of natural and synthetic fiber materials. In accordance with the above, example raw material makeups (excluding additional additives) of the core compositions are shown in Table 1 below.

TABLE 1

|  | Component 1 | Component 2 | Component 3 |
| --- | --- | --- | --- |
| Core 1 | CaCo3(65%) | PVC (25%) |  |
| Core 2 | CaCo3(55%) | PVC (25%) | Wood fibers (10%) |
| Core 3 | CaCo3(45%) | PVC (45%) | Wood fibers (5%) |
| Core 4 | MgO (55%) | MgCl2 (25%) | Wood fibers (10%) |
| Core 5 | MgO (40%) | MgCl2 (20%) | Wood fibers (30%) |

In an example embodiment, the plastic composite core can be a highly-filled, rigid PVC core. A highly-filled core can comprise a percent by weight of filler that is at least double that of the percent by weight of PVC. For instance, the amount of filler can be approximately 65% by weight of the core and the amount of thermoplastic can be 25% by weight of the core (e.g., 65% CaCo3 and 25% PVC). As used herein, "rigid" may refer to a core that is substantially free of a plasticizer or other flexibility-imparting material.

A core such as this may be produced by a variety of different techniques, such as extrusion, co-extrusion, hot press, calendaring, or continuous press.

The core of the present invention can be solid or foamed.

The thermoplastic composite core of the present invention may be made of one layer or a plurality of layers.

In some embodiments, the core may comprise other additives such as foaming agents, heat stabilizers, wax, and impact modifiers to adjust other properties of the core.

In other embodiments, the core may be a mineral composite core. A mineral composite core may be a core that includes a primary component comprised of an inorganic compound and a secondary component comprised of a filler. For instance, in some embodiments, the primary component may be magnesium oxide. In other embodiments, the primary component may be calcium silicate, fiber cement, magnesium oxide, gypsum, perlite, fired or unfired clay, magnesium chloride, or a combination thereof. In some embodiments, the composite mineral core may comprise one or more additional components comprised of one or more of a filler, an additive, a foaming agent, a binder, such as wood fibers, or a reinforcing component, such as a fiberglass board or fiberglass fibers. In some embodiments, the composite mineral core may comprise a secondary component comprising a magnesium salt, such as magnesium chloride or magnesium sulfate.

In some embodiments, the density of the core may be varied depending on the application. For example, for a flooring application, the density of the mineral composite core can be between about 1100 kg/m$^3$ to about 1600 kg/m$^3$. For instance, in an example embodiment, the density of the mineral composite core can be about 1200 kg/m$^3$ to about 1500 kg/m$^3$. In contrast, for a wall application, a lighter density core is preferred, such as a mineral composite core having a density of about 800 kg/m$^3$ to about 1200 kg/m$^3$. As used herein, the density of the board may refer to the calculation of dividing the weight of the specimen by the volume of the specimen (width×thickness×length).

Various methods are known in the art to adjust the density of the mineral composite core. For instance, in some embodiments, a lightweight filler (e.g., perlite) or polystyrene may be added. In other embodiments, the fiber content may be increased (e.g., to 40% or less of wood fibers) or a foaming agent (e.g., sodium bicarbonate or azodicarbonamide) may be used. Additionally, in some embodiments, natural fibers, such as cellulose, wood fibers, or bamboo fibers, or cork particles may be incorporated to increase flexibility. Natural fibers within the core can also be incorporated to improve the strength of the locking system. In some embodiments, the mineral composite core can comprise from about 3% to about 15% by weight of natural fibers. Depending on the type of inorganic compound used, the mineral composite core may be too brittle for use, so a reinforcing material can be used to impart additional strength and flexibility to the board. In some embodiments, one or more fiberglass mesh layers may be used to strengthen the core.

In some embodiments, the mineral composite core can additionally include a binder. The type of binder can be important for providing adequate locking strength for the locking system mating protrusions and receptacles. In some embodiments, the binder may be magnesium sulfate, magnesium chloride, or a combination thereof. To provide a suitable substrate for a flooring material, the binder content used therein can be 50% by weight or less. Table 2 illustrates example embodiments of the core composition comprising magnesium oxide:

TABLE 2

| Use | Name | Chemical | MgO core type 1 | MgO core type 2 |
|---|---|---|---|---|
| Binder | Magnesium Oxide | MgO | 36% | 51% |
| Hardener | Magnesium Chloride | MgCl$_2$ | 23% | |
| Hardener | Magnesium Sulfate | MgSO$_4$ | | 30% |
| Modifying agent | Ferrite Sulfate/Phosphoric acid | FeSO$_4$, H$_3$PO$_4$ | 6% | |
| Filler | Wood/Bamboo fibres | | 16% | 7% |
| Filler | Perlite | | 11% | 4% |
| Reinforcing material | Glass Fiber | | 8% | 8% |
| | Total | | 100% | 100% |

In some embodiments, the core can be waterproof. The core can be solid or foamed.

Embodiments of the presently disclosed panels exhibit improved scratch resistance as compared to currently-available thermoplastic core products (e.g., SPC, WPC and RCB).

For instance, panels as provided by the present disclosure (e.g., Table 1 and Table 2) were tested using the Laminate Floor Coverings—Test Method For The Determination of Micro-Scratch Resistance, EN 16094 (2012), procedure B, which requires a sample surface be checked for scratches after 160 revolutions of a Martindale test machine. As compared to SPC, WPC, and RCB products on the market, which exhibited notable scratching after 160 revolutions, panels of the present disclosure can endure between 200 and 10,000 revolutions before exhibiting noticeable scratches, as exhibited in Table 3.

Additionally, as exhibited in Table 3, panels of the present disclosure show improved deep scratch resistance when tested according to ISO 1518.

TABLE 3

| | Micro scratch resistance (EN 16094) | Deep scratch resistance (ISO 1518) |
|---|---|---|
| Traditional WPC flooring (CaCO$_3$ (45%), PVC (45%), wood fibers (5%)) | First scratch appears between 50 and 160 cycles | 7N to 14N |

TABLE 3-continued

| | Micro scratch resistance (EN 16094) | Deep scratch resistance (ISO 1518) |
|---|---|---|
| Traditional SPC flooring (CaCO$_3$ (45%), PVC (45%), foam agent (5%) | First scratch appears between 50 and 160 cycles | 10N to 17N |
| Embodiments of the Present Disclosure (e.g., MgO (55%), MgCl$_2$ (25%), and Wood Fibers (10%) with construction similar to FIG. 1) | First scratch appears after 200 cycles | 20N to 30N |

The presently disclosed panels also have improved heat resistance as demonstrated by the "cigarette burn test method" described in EN 438-2. When tested via EN 438-2, the described panels have no mark or slight marking due to a cigarette burn whereas traditional vinyl, SPC or WPC flooring show a moderate to severe mark.

In some embodiments, the core can be waterproof and structurally rigid enough to be profiled with a glueless locking system.

Embodiments of the present disclosure can further show improved coefficient of expansion, moisture resistance, and dimensional stability as discussed in greater detail with respect to Examples 1 and 2 below.

In some embodiments, the adhesive selected to be combined with the melamine resin has a high transparency when applied over the décor layer. Transparency of the adhesive can be measured by applying the adhesive on a uniform white film and then measuring the color difference (Δa, Δb, Δc, ΔE) between the areas with the adhesive and without the adhesive using, for instance a spectrophotometer. Ideally the ΔE is less than 1 after application of the adhesive. In some embodiments, the adhesive is heat-resistant from at least 130° C. and up to about 200° C.

In some embodiments, a polyurethane adhesive resin (resistant to temperature up to about 200° C.) can be used to reduce the pressing time. In some embodiments, the polyurethane adhesive resin is water-based to dry quickly to facilitate packaging of the panels at the end of the manufacturing process.

As discussed in more detail below with respect to FIGS. 1-9 and 12-13, the panels may have various additional layers including a décor layer (e.g., a layer comprising a decorative pattern or image that can in some instances be printed on it by rotogravure or digital print technology), one or more adhesive layers (e.g., polyurethane, polyester, polyethylene, ethyl vinyl acetate, nylon, polyolefin, polyvinyl acetate, acrylic, urethane), one or more balancing layers, one or more cushioning layers, or one or more sublayers (e.g., cork, ethyl vinyl acetate, polyethylene, polypropylene, polyurethane, or PET). In some embodiments, the one or more sublayers may be a thermoplastic sublayer, such as a sublayer composed of a thermoplastic material (e.g., PVC). In some embodiments, the protective layer may be a thermoplastic layer, such as a vinyl protective layer.

In some embodiments, the core can have a thickness in the range from about 3 mm to about 15 mm. In other embodiments, the core can have a thickness in any range between the two foregoing values. In an example embodiment, the rigid core can have a thickness of 8 mm.

Turning now to the figures where various example embodiments of panels are illustrated and reference numerals are used to refer to certain components of the depicted panels, the embodiments illustrated in the figures are merely example embodiments and are not intended to limit this disclosure. The various components of the panels illustrated in the figures may have some or all of the features described above.

FIG. 1 is a cross-sectional and expanded view of a first embodiment of panel 10 according to the present disclosure. Panel 10 comprises plastic composite core or mineral composite core 3 and protective layer 1 disposed above core 3. In some embodiments, core 3 can be waterproof and/or solid as opposed to foamed. In some embodiments, protective layer 1 can be a substantially transparent paper impregnated with a melamine resin wherein the melamine resin comprises wear resistant particles, such as, but not limited to, aluminum oxide particles. Panel 10 further comprises décor layer 2 disposed above core 3. In some embodiments, décor layer 2 can be a PVC film comprising a printed motif.

Adhesive layer 11 is positioned between protective layer 1 and décor layer 2 forming a bond between protective layer 1 and décor layer 2. An optional balancing layer 4 is shown in FIG. 1. In some embodiments, balancing layer 4 can include a paper impregnated with a melamine resin. Balancing layer 4 is bonded to a bottom surface of core 3 via second adhesive layer 12. While the use of a balancing layer 4 is not required, in some embodiments, it can be advantageous because balancing layer 4 can mitigate or avoid the effects of environmental changes on the finished panel 10. For instance, the use of balancing layer 4 balances tension created by protective layer 1, thereby improving the dimensional stability of panel 10 and prevent warping overtime. Likewise, an optional cushioning pad 6 may be adhered on the bottom surface of balancing layer 4 by third adhesive layer 5. If no balancing layer 4 is used, then cushioning pad 6 would be adhered to bottom surface 17 of core 3. Any cushioning pad known in the art can be used such as foamed EVA, PVC, PE, PP, PU, polystyrene (PS) pad, a cork pad, or a pad made with natural fibers (e.g., jute, coconut, cellulose, straw, among others)

Figure 2:
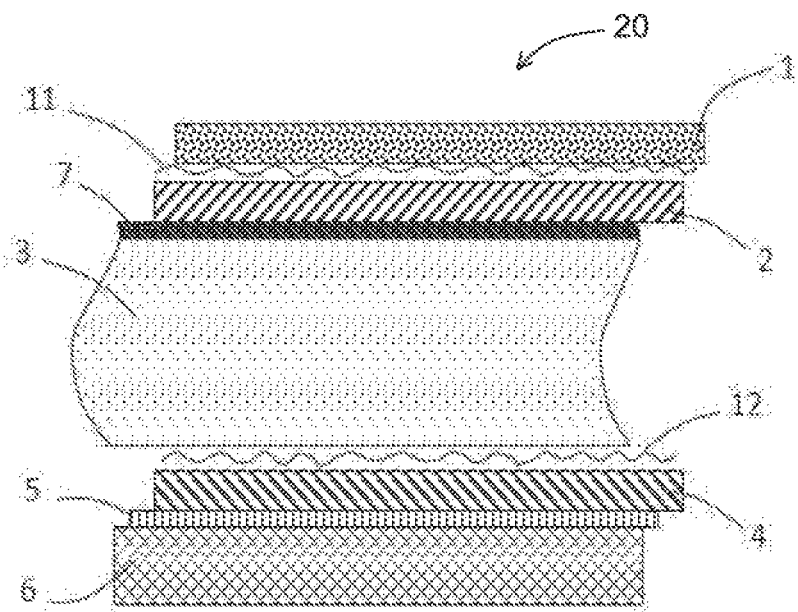
FIG. 2 is a cross-sectional view of a second embodiment of a panel according to the present disclosure, the panel comprising a waterproof solid polymer-based or mineral-based core, a protective layer comprising a melamine-impregnated paper, and an upper sublayer.

FIG. 2 is a cross-sectional, expanded view of a second embodiment of a panel 20. Panel 20 has a similar construction to the embodiment of FIG. 1, but further comprises an optional upper sublayer 7 positioned between décor layer 2 and core 3. Sublayer 7 is a PVC layer, but may alternately comprise cork, EVA, PE, PP, PU, or PET. Sublayer 7 can be advantageous because it can improve comfort underfoot, reduce sound transmission, and increase the dimensional stability of panel 20.

Figure 3:
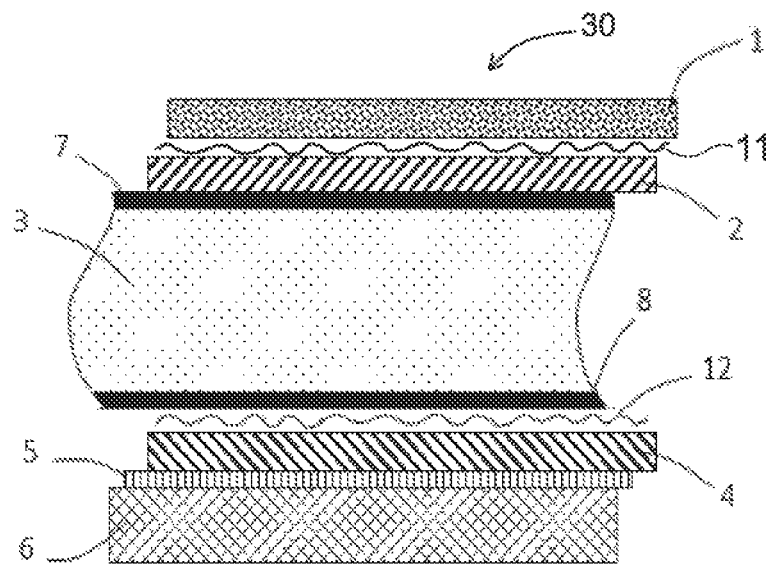
FIG. 3 is a cross-sectional view of a third embodiment of a panel according to the present disclosure, the panel comprising a waterproof solid polymer-based or mineral-based core, a protective layer comprising a melamine-impregnated paper, and a lower sublayer.

FIG. 3 is a cross-sectional, expanded view of a third embodiment of a panel 30. Panel 30 has a construction similar to the embodiment of FIGS. 1 and 2, but further comprises an additional lower sublayer 8 positioned below core 3 and balancing layer 4. In some embodiments, lower sublayer 8 is made of the same material as upper sublayer 7 (e.g., PVC) though other materials may also be substituted, such as cork, EVA, PE, PP, PU, or PET. The lower sublayer 8 can be advantageous because it can improve the dimensional stability of panel 30 by creating a balanced structure to reduce potential internal tensions within the panel, similar to that discussed above with respect to FIG. 1.

In some embodiments, sublayers 7 and 8 shown in FIGS. 2 and 3 can be produced by a calendaring process to improve comfort underfoot. Alternatively, in some embodiments, sublayers 7 and 8 may be produced by an extrusion process or continuous process. If core 3 and sublayers 7 and 8 are all produced with the same production process, it is possible to "sandwich" these layers in a single process to reduce cost. For example, a co-extrusion process may be used to produce the layers in a continuous form which is then cut to the desired length.

Figure 4:
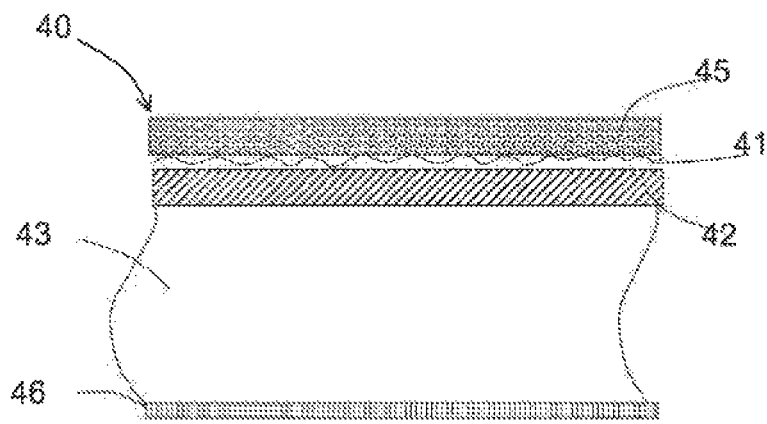
FIG. 4 is a cross-sectional view of a fourth embodiment of a panel according to the present disclosure, the panel comprising a waterproof solid polymer-based core having a layer in which the melamine resin and adhesive are combined prior to application to the core.

FIG. 4 is a cross-sectional, expanded view of a fourth embodiment of a panel 40. Panel 40 includes a plastic composite core 43 and a décor layer 42 disposed above core 43. In some embodiments, décor layer 42 may comprise a printed PVC film, in which case décor layer 42 can be adhered or bonded to core 43 by a waterproof adhesive layer (not shown in FIG. 4). Décor layer 42 may further include a decorative motif (not shown) printed thereon. Décor layer 42 may alternatively comprise a paper having a decorative motif (not shown) printed thereon, or it may comprise a decorative layer of vinyl, rubber, or another suitable thermoplastic. In another embodiment, décor layer 42 may alternatively comprise an upper portion of core 43 itself, core 43 having a digitally printed decorative motif (not shown) printed directly on core 43, or digitally printed indirectly such as with screen printing and the like.

FIG. 4 further shows a protective layer 45 (e.g., a melamine protective layer) applied to and covering the décor layer 42. A first adhesive layer 41 is disposed between protective layer 45 and décor layer 42. In some embodiments, protective layer 45 and first adhesive layer 41 of the panel illustrated in FIG. 4 may be applied by roller applicator on top of the décor layer 42, as illustrated for instance in FIG. 10a (discussed below).

As with previous embodiments, panel 40 may further comprise a balance layer 46.

Figure 5:
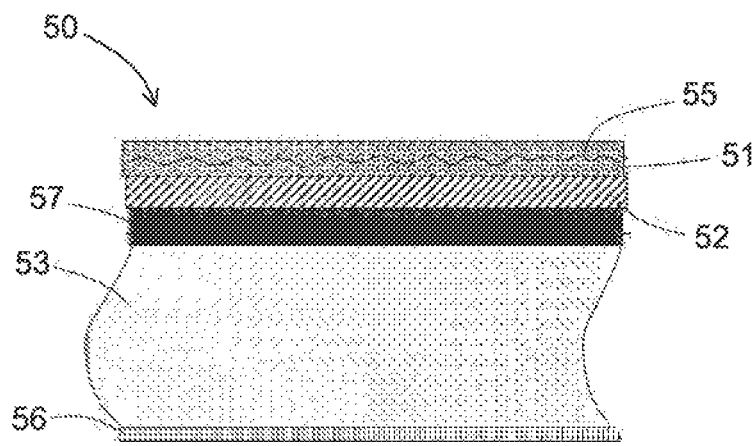
FIG. 5 is a cross-sectional view of a fifth embodiment of a panel according to the present disclosure, the panel comprising a co-extruded waterproof solid polymer-based core having a melamine scratch-resistant layer.

FIG. 5 is a cross-sectional, expanded view of a fifth embodiment of a panel 50. Panel 50 is similar to the embodiment in FIG. 4 except that adhesive layer 51 is incorporated into the protective layer 55. For instance, adhesive layer 51 can be incorporated into the protective layer 55 via the roller coat application illustrated in FIG. 10b. In panel 50 of FIG. 5, core 53 is a foamed core, containing air pockets (not shown). A soft layer 57 is placed between décor layer 52 and core 53 to enhance the acoustic performance (i.e., making it a quieter surface). Soft layer 57 may comprise cork, PVC, rubber or any other suitable material exhibiting sound absorbing or dampening characteristics. Soft layer 57 is adhered between décor layer 52 and core 53 by second and third adhesive layers (not shown). Because the foamed core 53 is porous, an adhesive is necessary to bond soft layer 57 and foamed core 53. Panel 50 may further comprise a balance layer 56.

Figure 6:
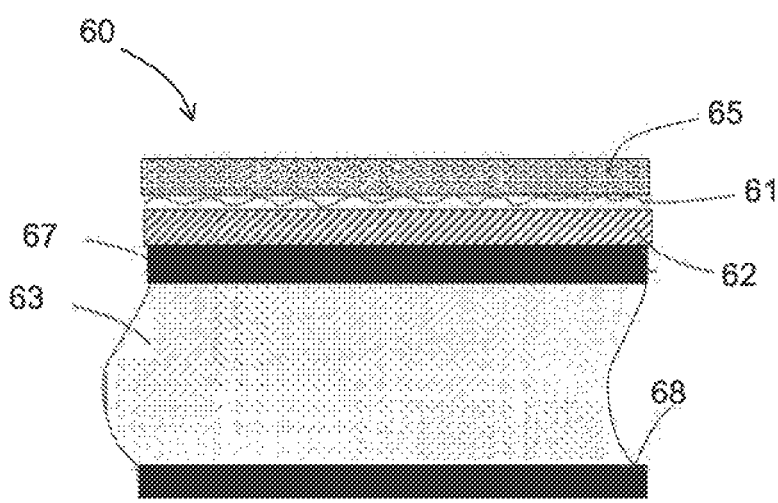
FIG. 6 is a cross-sectional view of a sixth embodiment of a panel according to the present disclosure, the panel comprising a virtually transparent thermoplastic layer bonded between the protective layer and the décor layer.

FIG. 6 is a cross-sectional, expanded view of a sixth embodiment of a panel 60. The embodiment of a panel 60 produced according to the present invention shown in FIG. 6 is similar in construction to panel 60 of FIG. 6, but in this embodiment, core 63 is co-extruded, which means that sublayers 67 and 68 are extruded at the same time as core 63 and bonded to or fused with core 63 as part of the co-extrusion process. Core 63 preferably comprises a foamed core having a density between about 600 kg/m$^3$ to about 2,000 kg/m$^3$. Décor layer 62 is fused to the top sublayer 67 during the extrusion process as well. Melamine protective layer 65 is roller-applied to coat and cover the décor layer 62 and a first adhesive layer 61 is used between protective layer 65 and décor layer 62 to ensure optimal adhesion.

Figure 7:
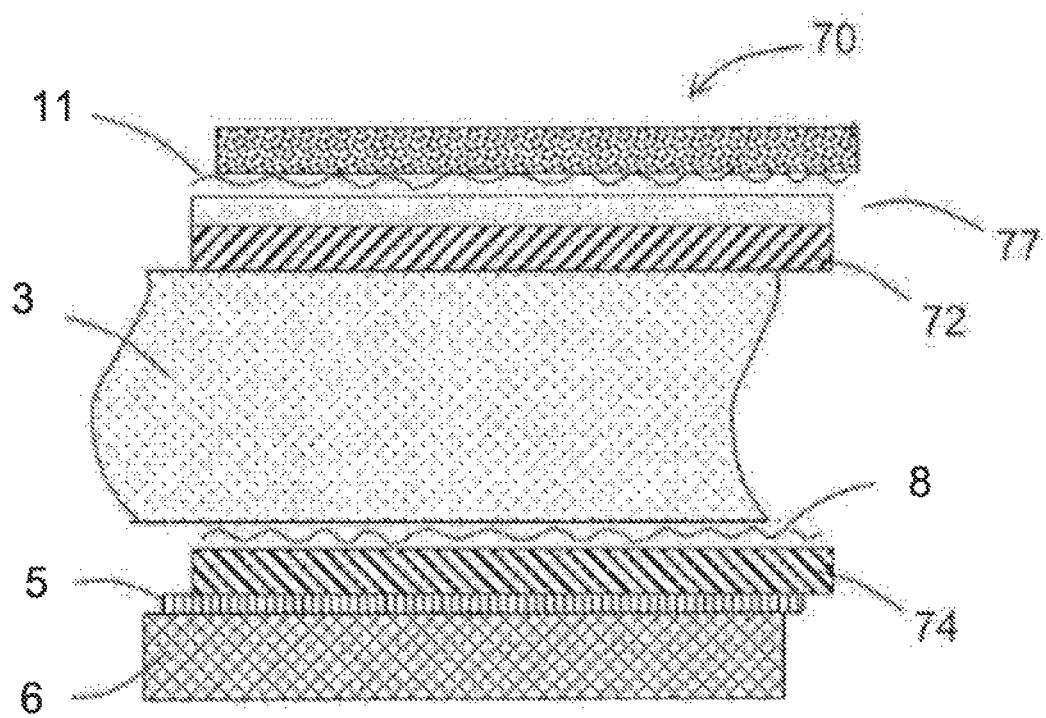
FIG. 7 is a cross-sectional view of a seventh embodiment of a panel according to the present disclosure.

FIG. 7 is a cross-sectional, expanded view of another alternative embodiment of a panel 70 produced according to the present disclosure. Panel 70 is similar in construction to FIG. 1 but further comprises a thermoplastic layer 77 between décor layer 72 and protective layer 71. In some embodiments, thermoplastic layer 77 preferably can comprise PVC, but other materials may alternately be used, such as, but not limited to, PET, PU, and PE. Additionally, thermoplastic layer 77 can be a virtually transparent thermoplastic layer.

Bonding a virtually transparent thermoplastic layer 77 between décor layer 72 and protective layer 71 allows the use of a lighter melamine-impregnated paper as protective layer 71 and balancing layer 74, which helps to improve the dimensional stability of the product. In this case, the melamine-impregnated paper used as protective layer 71 has a weight of between about 10 g/m$^2$ to about 35 g/m$^2$ and, in an example embodiment, of about 20 g/m$^2$. The weight of the paper of the balancing layer 74 can be from about 10 g/m$^2$ to about 140 g/m$^2$, and in an example embodiment, about 90 g/m$^2$. Incorporating a lightweight melamine impregnated paper as the protective layer provides superior scratch resistance. In some embodiments, a virtually transparent thermoplastic layer 77 may be included to improve wear resistance. In some embodiments, the virtually transparent thermoplastic layer 77 may comprise a transparent PVC wear layer. The thickness of the virtually transparent thermoplastic layer 77 can vary from about 0.1 mm to about 0.7 mm and in some embodiments is about 0.3 mm.

Figure 8A:
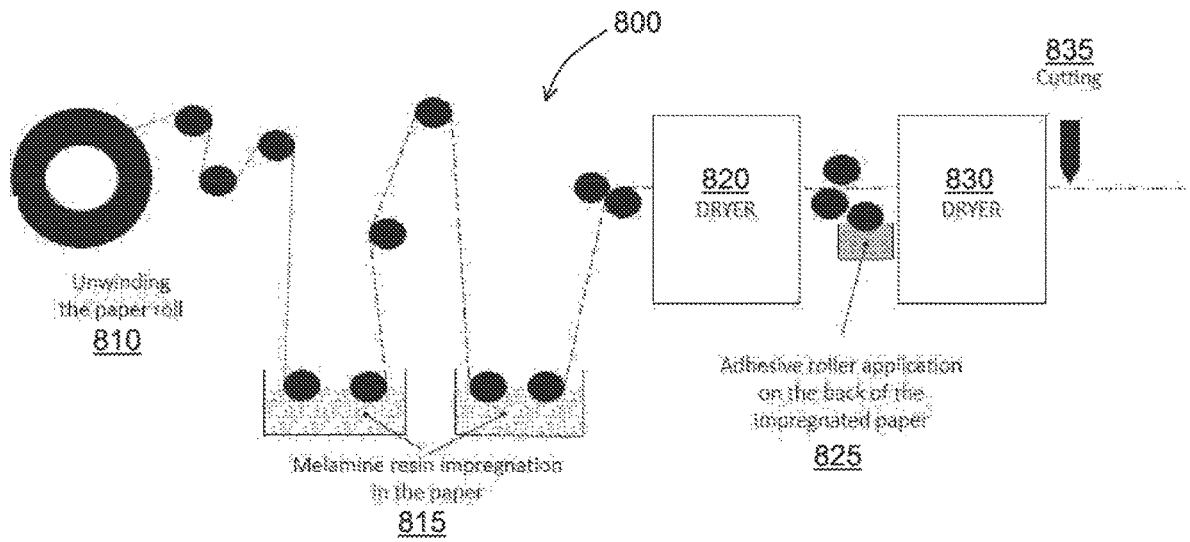
FIG. 8A is a schematic representation of a first alternative method of impregnating a paper layer with a melamine resin and applying an adhesive.
Figure 8B:
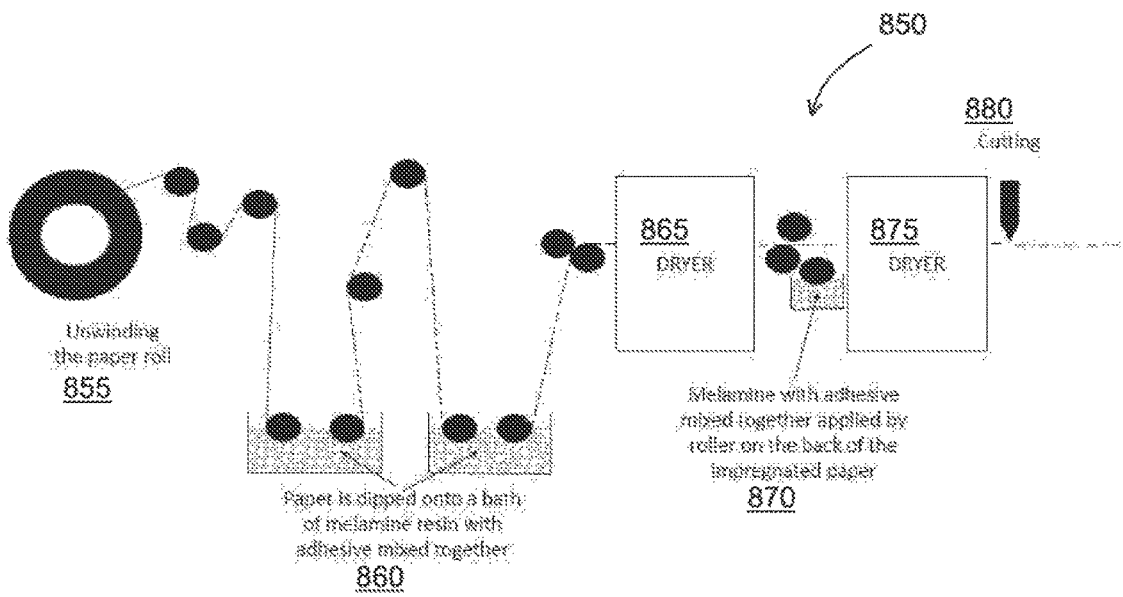
FIG. 8B is a schematic representation of a first alternative method of impregnating a paper layer with a melamine resin and applying an adhesive.

FIGS. 8A and 8B illustrate example methods for applying an adhesive layer for joining or bonding the protective layer to the core. A first method 800, shown in FIG. 8A, comprises unwinding a paper roll 810 comprising a paper to be impregnated, impregnating the paper with a melamine resin 815, drying the impregnated paper in a dryer 820, applying an adhesive on a back surface of the impregnated paper using a roller application 825, drying the impregnated paper in a dryer 830, and then cutting the impregnated paper 835 to a size sufficient to apply to a core. In some embodiments, when the resin-impregnated paper is dried in the first drying process, the resin is about 80% dried after the drying process.

In some embodiments, the impregnated paper can be applied to the core using a hot press process. There are 3 types of hot press processes that may be used to apply the paper to the core: single daylight hot press, multilayer process, and continuous press. In embodiments incorporating a multilayer hot process, multiple layers (e.g., wear layer, protective layer, décor layer, and core layer) intended to be pressed together are sandwiched between two plates. Once all the layers are loaded on the plates, the press is closed and heat is added to each plate. A pressure of 8 MPa to 18 Mpa can be used during the heat phase at a temperature of around 40° C. for about 20 minutes.

In embodiments incorporating a single daylight press, layers are positioned between two plates and the press is closed. The plates are pressed together at a pressure of between 16 and 21 MPa at a temperature of around 190° C. for about one minute. In embodiments incorporating a continuous press, layers are positioned between two conveyer belts that are heated and caused to apply a continuous pressure on the layers.

Another example method 850, shown in FIG. 8B, comprises unwinding a paper roll 855, dipping the paper into a bath comprising a mixture of melamine resin and adhesive 860, drying the impregnated paper in a dryer 865, applying an adhesive layer comprising a mixture of melamine and adhesive using a roller application on a back surface of the impregnated paper 870, drying the paper in a dryer 875, and cutting the paper 880. This method differs from that described in FIG. 8A in that the adhesive layer is not separately applied.

Figure 9A:
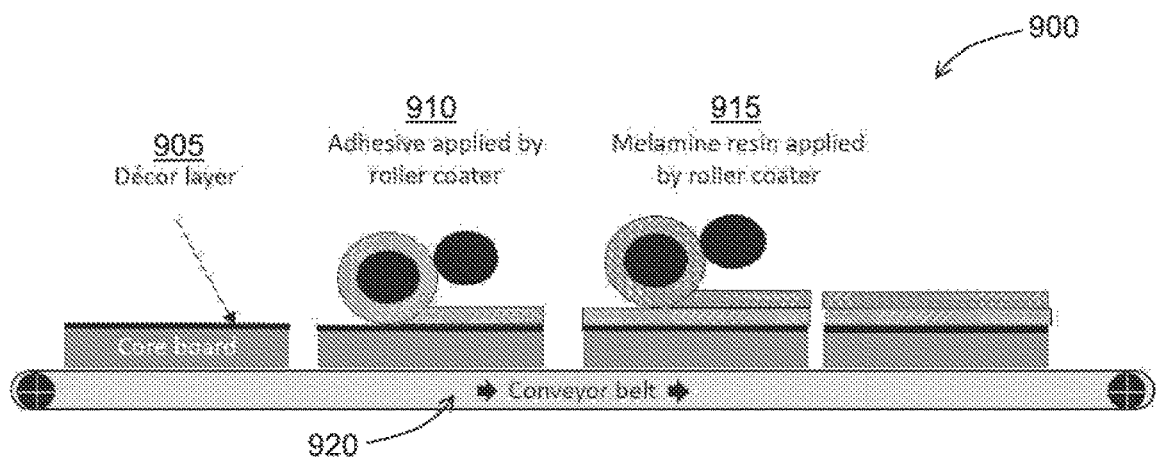
FIG. 9A is a schematic representation of a first alternative method of applying a polyurethane adhesive layer immediately below the melamine protective layer for a panel produced according to the present disclosure.
Figure 9B:
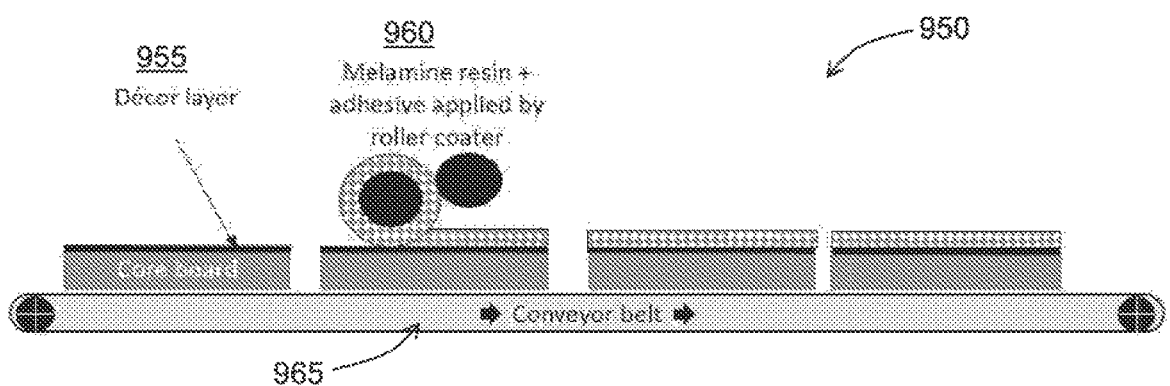
FIG. 9B is a schematic representation of a second alternative method of applying adhesive to a plank produced according to the present disclosure, wherein the adhesive is combined with the melamine resin, thereby creating a formulation which is then used to impregnate the paper.

Another method of applying the polyurethane adhesive to create a panel according to the present invention is illustrated in FIGS. 9a and 9b and comprises the steps of applying the adhesive on the surface of the core board with a roller applicator. The core may be either a polymer-based or mineral-based core with or without a décor layer (and any intermittent layers between the core and the décor layer). As explained above, the décor layer can be an image printed directly on the core surface, or it can be a decorative film or paper, or a wood veneer. The décor layer can have a substantially smooth surface or may be embossed. In an example embodiment, in-register embossing is used to provide a more realistic look to the finished product.

FIG. 9A is a schematic representation of a first process 900 incorporating a conveyer belt 920 and roller application. The first process 900 comprises applying a first adhesive layer using a roller coating application 910 to a top surface of a décor layer 905, and then applying a melamine resin layer using a roller coating application 915 to a top surface of the adhesive layer.

FIG. 9B is a schematic representation of a second process 950 incorporating a conveyer belt 965 and roller application. The second process 950 comprises applying a mixture of a first adhesive and melamine resin using a roller coating application 960 to a top surface of a décor layer 955. While FIGS. 9A and 9B show only the application of a single coating layer of the combination, but the application steps of both processes can be repeated as necessary to apply several coats to reach the desired amount or quantity of the resin being applied. In some embodiments, the temperature range for the process can be between about 50° C. to about 150° C. for this coating process and can more specifically be between 120° C. and 140° C.

In some embodiments, when several layers are applied, it is possible to add urethane resin as well to improve the application process to reduce the tackiness of the surface and improve the adhesion of the various layers.

Figure 10:
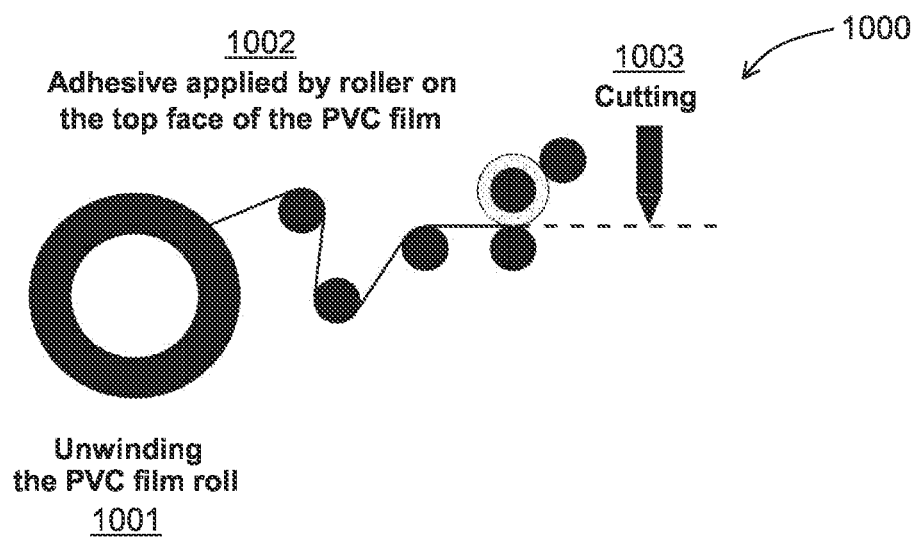
FIG. 10 is an illustration of an alternative method of applying an adhesive layer between the melamine layer and the décor layer of a panel produced according to the present disclosure.

FIG. 10 is a schematic representation of a process 1000 for applying an adhesive layer (e.g., a polyurethane adhesive) between the melamine layer and the décor layer, such as the embodiment shown in FIG. 1. This process 1000 comprises unwinding the PVC film roll 1001, utilizing a roller to apply the adhesive on the upper surface of the décor layer 1002, such as a PVC film, and cutting the plank 1003. The depicted process can be used for other décor materials as described above. The adhesive application is generally controlled to produce an application of between about 10 g/m$^2$ to about 100 g/m$^2$, and preferably between about 20 g/m$^2$ to about 50 g/m$^2$. For this process, the adhesive may be a water-based adhesives (e.g., TRIS acetate based adhesives and polyurethane-based adhesives) since such adhesives dry quickly to be able to package the panels at the end of the manufacturing process.

Another advantage of the present disclosure is that improved 3D texturing can be used to improve the appearance of the panels. Another pair of related prior patents, U.S. Pat. No. 7,763,345 (the "'345 patent") and European Patent No. 2248665 (the "'665 patent"), describe an aminoplast resin top layer, but the aminoplast material is again an HPL layer. HPL was used by the owner of these patents several years ago to make a flooring product, but that product quickly disappeared from the market because of the complexity and high cost of the process. The product described in the '345 and '665 patents has an HPL top layer and a thermoplastic core, the HPL top layer is produced separately first as a separate sheet and completely cured. Subsequently, the top layer is pressed on top of the core. The depth of 3D texturing of the surface of products produced according to the '345 and '665 patents is limited to the thickness of the HPL itself 3D texturing cannot extend into the core of products produced according to these prior art patents because the protective layer is separately produced and cured before being applied to the core. In the present invention, there is no need for this first separate process and therefore 3D texturing can extend into the core of the products.

Figure 11B:
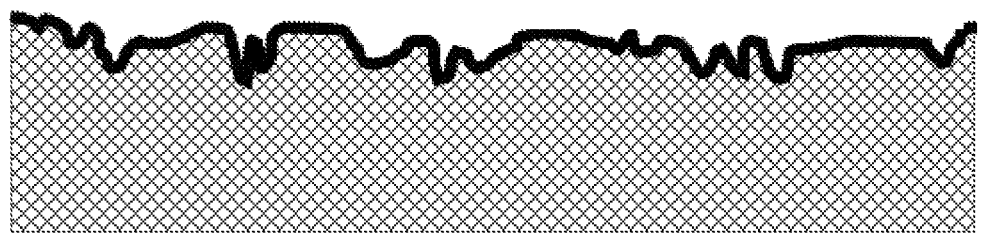
FIG. 11B is a graphical representation of a cross-sectional view of a plank produced according to the present disclosure illustrating the depth of embossment of the protective layer to the core.
Figure 11A:
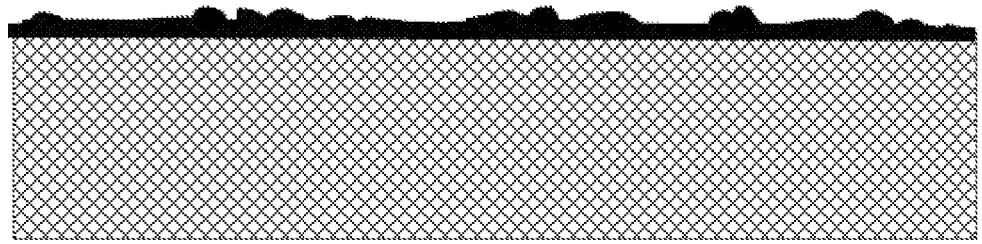
FIG. 11A is a graphical representation of a cross-sectional view of a prior art panel illustrating the depth of embossment of a wear layer to the core of the plank.

A cross-sectional view of the prior art panel produced according to the '345 and '665 patents, is illustrated in FIG. 11A. In FIG. 11A, the solid portion represents the HPL top layer. The cross-hatched areas represent the thermoplastic core. As can be seen, the 3D texture is embossed only in the HPL itself. The 3D texture does not extend into the thermoplastic core. The use of a thicker layer of HPL for this product would allow for the creation of a deeper texture and result in a more realistic look, but the use of a thicker HPL layer in connection with the invention of the '345 and '665 patents would considerably increase the cost of the product, rendering such a product economically infeasible.

In contrast, FIG. 11B illustrates how utilizing the process of the present disclosure provides the ability to emboss the wear layer and a portion of the core, thereby enabling for deeper embossing, a significantly improved 3D texture and, thus, a more natural appearance. In FIG. 11B, the solid colored area represents the impregnated paper and the cross-hatched area represents the thermoplastic core. The 3D texture may be embossed into the core itself, effectively stamping the impregnated paper into the core. This enables the product to carry a very deep texture which results in a finished product having a much more realistic-look.

FIGS. 12-13 illustrate example embodiments of panels (1100, 1200) comprising a plurality of layers including a combined protective layer and décor layer (1101 and 1201). The panels illustrated in FIGS. 12-13 can generally have the same construction as the panel illustrated in FIG. 1, with the exception of the top layer. FIG. 12 illustrates a décor layer 1101 impregnated with a melamine resin and adhered to the top surface of a composite core 3 via a separate adhesive layer 11. FIG. 13 illustrates an alternative embodiment in which a décor layer 1201 is impregnated with a melamine resin combined with an adhesive 9 to adhere the décor layer 1201 to the top surface of the composite core 3. FIG. 13 additionally comprises a balancing layer 4 also impregnated with melamine resin and an adhesive 12 to adhere the balancing layer to the bottom surface of the composite core 3, as shown for instance with respect to FIGS. 1 and 3. In some embodiments, the décor layer can be impregnated with the melamine resin by the manufacturing processes described in FIGS. 8A and 8B and the panels can further be formed by the manufacturing processes described in FIGS. 9A-10.

The décor layer (1101 and 1201), which is composed of a paper impregnated with a melamine resin, can serve as a scratch, abrasion, and light-resistant layer. In other words, the décor layer (1101 and 1201) can serve as a protective layer. This can be achieved by, for instance, impregnating a décor paper with melamine and abrasion-resistant particles (e.g., aluminum oxide, silicon dioxide, ceramic beat, diamond particles, or a combination of thereof). In some embodiments, the décor paper can be printed using rotogravure or digital print technology. The amount of melamine resin impregnated within the paper of the décor layer (1101 and 1201) can range from 30 g/m² to 180 g/m² depending on the desired level of protection. In other embodiments, this protection can also be achieved by applying transparent melamine overlay paper, for instance having a weight 10-60 g/m² before impregnation on top of the décor paper. The décor layer (1101 and 1201) may or may not be paper. For example, in some embodiments, the décor layer (1101 and 1201) can be made of a film (e.g., a thermoplastic or polymer film), or the décor layer (1101 and 1201) may be printed directly onto the core and protected by a coating. In other embodiments, the décor layer (1101 and 1201) may also be a wood veneer that is glued to the core 3 and protected by a coating.

In an example embodiment, the core 3 is a magnesium oxide board that is manufactured by the chemical interaction between magnesium oxide and magnesium chloride and further comprises natural fibers. The crystals formed during the reaction bind the natural fibers together to give strength to the core 3. This reaction can happen under a pressure of 500 to 2000 tons and temperatures ranging from 10° C. to 50° C. (i.e., ambient temperatures). It is understood that the core 3 can be made using other metal oxides and salts that allow the décor layer (1101 and 1201) to be easily bonded to the core 3. In an example embodiment, the natural fiber content may range from 20 to 50% by weight of the core 3. In some embodiments, the natural fiber content of the core 3 may be less than 20%. The natural fibers may include, but is not limited to, wood fiber, wood dust, bamboo dust or fiber, sawdust, grass, straw, etc. In other embodiments, the core 3 may not comprise natural fibers and in other words be devoid of natural-based materials. In some examples, the core 3 may include synthetic fibers instead of natural fibers or a combination of both synthetic and natural fibers.

In an example embodiment, the density of the core 3 can be between 1100 kg/m³ to about 1600 kg/m³.

The core 3 can be produced by a wet or dry process or a combination of these two.

In other embodiments, the core 3 may be a plastic composite core as discussed previously.

In some embodiments, the balancing layer 4 can comprise a paper impregnated with a melamine resin and can give stability to the composite panel (e.g., 1100, 1200). The balancing layer 4 does not need to be a paper or a film. In some embodiments, the balancing layer 4 can comprise a coating. In certain applications, a balancing layer might not be needed, for instance, if stability can be achieved by the core itself.

In some embodiments, the cushioning layer 6 disposed below the balancing layer 4 can be made of any material, including PET, PP, PE IXPE, EVA, and cork.

In some embodiments, the composite panel, such as that illustrated in FIGS. 12-13 can be produced by thermal laminating the layers in a static press at a temperature of from about 175 to about 210° C. and a pressure of from about 15 to about 25 MPa. In some embodiments, a texture plate can be utilized to add texture to the top layer. In other example embodiments, the different layers of the composite panel may be bonded together by other appropriate techniques such as by using adhesives.

In some embodiments, the composite panel, for instance as illustrated in FIGS. 1-13, may further comprise a bevel formed therein. In other embodiments, the composite panel may not include a bevel. The bevel may be formed along an edge of the panel (e.g., short edge, long edge, etc.). Further, the bevel may be any type of bevel, including, but not limited to, a pressed bevel, a printed bevel, a painted bevel, a micro bevel, a lacquered bevel, a transfer foil bevel, and a postform bevel, without departing from a broader scope of the present disclosure. In some examples, the bevel may extend from the décor layer and into the core. However, in other examples, the bevel may be limited to the décor layer and may not extend into the core.

In some embodiments, the composite panel, for instance as illustrated in FIGS. 1-13, may comprise a coupling profile to provide easy installation of the composite panel. In some embodiments, the coupling profile may be an edge locking mechanism. For instance, the coupling profile may include a tongue and groove profile (one side having a tongue and an opposite side having a groove). In some embodiments, the coupling profile may include a click profile that produces an auditory cue (click sound) when two composite panels are coupled to each other. In other examples, the coupling profile may include any other profiles (or shapes) that would allow one composite panel to be coupled to, securely engaged, and/or locked with another composite panel. The coupling profiles may be configured to allow vertical, horizontal, angular, or rotational coupling without departing from a broader scope of the present disclosure.

In some embodiments, the composite panels for instance as shown in FIGS. 1-13 may be formed as a plank. One skilled in the art would understand and appreciate that the plank may have any appropriate shape without departing from a broader scope of the present disclosure. In some other embodiments, the composite panel for instance as shown in FIGS. 1-13 may be formed as a tile. In some example embodiments, the metal oxide may include, but is not limited to magnesium oxide. Similarly, the metal salt may include, but is not limited to, magnesium chloride, magnesium sulfate, etc. The composite panel may or may not be free of fiberglass.

The composite panels for instance as shown in FIGS. 1-13 can be manufactured into any desired size, based on the targeted application. In some embodiments, the composite panels can have a length dimension greater than a width dimension. For example, the composite panels can be sized as a sheet, for example, a 12-inch by 24-inch sheet. Such a sheet can be cut into smaller sizes as needed. In other embodiments, the composite articles can be sized into a 7-inch by 48-inch sheet among other elongated sizes. In other embodiments, the composite panel can be further sized to fit an end product. Elongated composite panels can be useful, for example, as decking materials.

The composite panels can also have any desired thickness. In an example embodiment, the composite panel can have a thickness of from about 3 mm to about 15 mm.

In other embodiments, the composite panels can have a suitable shape and dimension commonly used in, for instance, floor tiles, wall tiles, ceiling tiles. In other embodiments, the composite panel can be a wall panel. In yet another embodiment, the composite panel can be a ceiling panel.

In other embodiments, the panels can be other shapes, other than rectangular, including but not limited to diamond, rectangles, triangles, and rounded.

Example 1—Magnesium Oxide Core Board

In an example embodiment, the presently disclosed composite panel may include the following composition by weight %: 34-36% by weight of magnesium oxide, 16-18% by weight of magnesium chloride, 28-32% by weight of plant fiber, 2-5% by weight of other materials, and optionally may include 8-10% by weight of perlite and/or 6-8% by weight of bentonite.

In some embodiments, the core may exhibit a coefficient of expansion (CoE) of less than 0.05% when subject to temperatures ranging from 10° C./50° F. to 50° C./125° F.

In some embodiments, the core may exhibit a three-point bend strength or flexural strength of greater than or equal to 200N when measured according to ASTM D1037. The core may exhibit the three-point bend strength whether left untreated or treated by either submerging the board in a 60° C./140° F. water bath for 48 hours, or by submerging the board in a 60° C./140° F. water bath for 8 hours and recovered (let dry) for 16 hours (cycle repeated 15 times). A three-point bend strength loss between a treated core (treated as described above) and an untreated core can be less than 10% when measured according to ASTM D1037. In particular, the samples of the core for the three-point bend test may be prepared according to the size requirements of ASTM 1037 (e.g., size and thickness or board).

In some embodiments, the core may exhibit an internal bond strength greater than or equal to 2 N/mm$^2$ when measured according to ASTM D1037. Further, in some embodiments, the thickness swell of the core may be less than 0.5% when measured according to NALFA LF01-3.2.

In some embodiments, the moisture content of the core can be less than or equal to (i.e., at most) 8% of the core's original weight (before heating) after the core is subjected to 65° C. for 24 hours and when measured according to GB/T 33544 or ASTM D1037. The weight may be measured until the core does not exhibit any change in weight (i.e., the weight of the board becomes stable). Further, in some embodiments, the water absorption rate of the core can be less than or equal to 10% when measured according to ASTM D570 and after immersing the core in a 60° C./140° F. water bath for 48 hours. Furthermore, the core may be configured such that the core may be dimensionally stable (e.g., does not bow) after being immersed in water for 72 hours.

In some embodiments, the core may be configured such that a concentration of magnesium salts may not be visible on any appropriate surface of the core after submerging half of the core in water. Further, in some embodiments, the core may be configured such that no water drops are present on the core after keeping the board at 30-35° C. and an RH>90% for 7 days according to Chinese Standard GB/T 33544-2017. Furthermore, in some embodiments, the core may be configured such that the leachable chloride ion content or the core can be less than or equal to 5% concentration (for core with magnesium chloride), or less than or equal to 1% concentration (for core with magnesium sulfate). These tests indicate that the board is stable in high humidity conditions. Under high humidity conditions, free chloride ions may move towards and collect at the surface of the board and appear as if the board is sweating. This may indicate that the board is unstable at high humidity conditions, and also may cause delamination, may be aesthetically unpleasing, and most importantly the chloride ions that come out to the surface may corrode metal or subfloor materials if it comes in contact with metal or other subfloor materials that are affected.

In some embodiments, the crystal composition of the core may be determined using the XRD (crystal chromatography) test. The XRD test may be conducted on an untreated board and on a board that is treated by immersing the board in a 60° C./140° F. water bath for 48 hours. In some examples, the core may be configured to have at least 10% of 5-phase crystals. In other examples, the core may be configured to have at most 80% 5-phase crystals. Further, in some embodiments, the core may be configured to have 3-phase crystals or other types of crystals (e.g., 9-phase crystals). In some embodiments, the core may include only 5-phase crystals, while in other aspects, the core may include other types of crystals or other materials as mentioned above. Furthermore, in some embodiments, the core may be configured such that the weather ageing simulation results of the core meets the criteria of category C when measured according to EN 12467.

Example 2—Composite Panel

In some embodiments, a composite panel may have the composition described above in Example 1 and the structure as shown, for instance in FIG. 13. In some embodiments, a dimensional stability of the composite panel can be measured according to the ISO 23999 Heat Curl Dimensional Stability standards. In certain aspects, the dimensional stability can be measured by analyzing the article's dimensional variations when the composite panel is heated to a temperature of about 70° C./160° F. for 6 hours and then cooled back to ambient temperature (e.g., 20° C.). The maximum variation shown in such aspects, are no more than about 0.25%, no more than about 0.2%, or no more than about 0.1%. In still other embodiments, the maximum variation observed can be any range of values derived by any two foregoing values. In some embodiments, the maximum variation is from about 0.1% to about 0.25%, or about 0.1% to about 0.2%. In still other embodiments, the maximum variation is no greater than about 0.2%, when the article is heated to 70° C./160° F. and then cooled to ambient temperature. In yet other embodiments, the composite panel may exhibit a shrinkage of less than or equal to 0.1% in length and width of the composite panel when measured according to ASTM F2199. Further, in some embodiments, the composite panel can exhibit curling less than or equal to 1 mm or less than or equal to 0.5 mm, where curling may be measured immediately after taking out the samples, not after recovery, according to ASTM F2199. In yet other embodiments, the average thickness swell of the composite panel can be less than or equal to 2% when measured on the edges and measured according to NALFA-3.2.

In some embodiments, the moisture content of the composite panel may be less than or equal to 10% of the original weight (before heating) after the rigid core board is subjected to 65° C. until the board is stable (e.g., indicates no physical changes) and when measured according to Chinese Standard GB T 33544. Furthermore, in some embodiments, the water absorption percentage of the composite panel may be less than or equal to 10% when measured according to ASTM D570.

In some embodiments, the leachable free chloride ion content in the composite panel may be less than or equal to 5% (e.g., for rigid core with magnesium chloride), or less than or equal to 1% (e.g., for a core with magnesium sulfate) when measured according to JC 688 (Chinese Industry Standard).

In some embodiments, the peel strength of the cushioning layer may be greater than or equal to 4 N/50 mm, where the peel strength is measured after the composite panel is heated to a temperature of about 140° F. for six (6) hours and then cooled back to ambient temperature. In yet other embodiments, the peeling/bonding strength between the décor layer and the rigid core layer may be greater than or equal to 30N/25 mm or 3 kg/25 mm when measured according to ASTM D903. Further, in some embodiments, the peeling/bonding strength between the décor layer and/or balancing layer when composed of vinyl and the MgO core (or rigid core layer) may be greater than or equal to 30N/25 mm or 3 kg/25 mm when measured according to EN 1372.

In some embodiments, the click tension force of the composite panel can be measured according to the ISO 24334 standards. In some examples, the average of the maximum click tension force of the composite panel may be greater than or equal to 2 kN/m. In other embodiments, the average of the maximum click tension force may be greater than or equal to 4 kN/m. Profiles of different sides of the composite panel may have different click tension forces.

In some embodiments the surface soundness of the composite panel may be greater than or equal to 1.00 N/mm$^2$ measured according to the NALFA LF01-3.10 standard. Further, in some embodiments, the composite panel exhibits a residual indentation of less than or equal to 0.18 mm (0.007 inch) thickness, when measured according to ASTM F3261. To measure a residual indent, a composite panel specimen may be placed under the presser foot. An initial thickness of specimen (T1) may be measured before applying the pressure and then the thickness (T3) of the specimen may be measured after the presser foot is removed and left untouched until there are no more changes in physical dimensions (i.e., until the product is stable). The residual indent is measured as (T1–T3).

In some embodiments, the composite panel can exhibit a static load indentation of less than 0.005 inches, when measured according to ASTM F970 or appropriate NALFA standard. To measure a static load, a composite panel specimen may be subjected to a desired pressure of 250 psi (panel with a pad) or 1160 psi (panel without a pad) by placing the composite panel specimen between a bottom indenter plate and an intermediate plate. An initial thickness of specimen (T1) may be measured before applying the pressure and then a recovered thickness (T3) of the specimen may be measured after the pressure is removed and left untouched until there are no more changes in physical dimensions (i.e., until the product is stable). The static load indentation is measured as (T1–T3).

In other embodiments, the composite panel exhibits a large ball impact resistance of greater than or equal to 1000 mm (39.4 inches) for a 340 g ball when measured according to NALFA LF01-3.5; and a small ball impact resistance of greater than or equal to 200 mm (7.9 inches) when measured according to NALFA LF01-3.6.

In some embodiments, the heat resistance of the composite panel may be measured according to ASTM F1514 and may be indicated using an average delta E value (change in internal energy of a system). In some examples, the average delta E value of the composite panel may be less than or equal to four (4) when measured after seven days of exposure to 70° C./160° F. Further, in other aspects, the light resistance of the composite panel may be measured according to NALFA LF 01 and/or ASTM F1515 and may be indicated using an average delta E value. In some embodiments, the average delta E value of the composite panel with the décor layer (melamine topper) may be less than or equal to four (4) when measured after 100 hours of exposure to light source at 420 nm with a radiance of 1.10, and a black panel temperature of 70° C./160° F. Further, in some examples, the average delta E value of the composite panel with only the protective coating layer may be less than or equal to four (4) when measured after 300 hours exposure to a light source of 340 nm with a radiance of 0.30, and a black panel temperature of 63° C./150° F. In some embodiments, the chemical resistance score of the composite panel may be less than 20 when measured according to NALFA LF 01 3.4.

In some embodiments, the composite panel can exhibit a critical radiant flux test rating of Class I (≥0.45 w/cm$^3$) according to the ASTM E-648 standard. Further, the smoke density of the composite panel can be less than or equal to 450 (flaming or non-flaming) when measured according to ASTM E662. Furthermore, in some embodiments, the slip resistance of the composite panel may be greater than 0.50 when tested dry using a leather slider foot, according to ASTM D2047. The composite panel may exhibit a scratch resistance rating of B1 after 500 revolutions when tested according to EN16094. The composite panel may further exhibit a Martindale rating of A1 after 80 revolutions when tested according to EN16094. The composite panel may further exhibit an abrasion rating of AC2 to AC6 when tested according to NALFA LF01-3.7 and using S32 calibrated wheels and S42 sanding paper.

As used herein, the term "décor layer" may refer to a layer providing a decorative effect to a plank but also providing protection against wear caused by normal usage of the planks, including but not limited to abrasion-resistance, scratch-resistance, and/or water-proofing. The decorative effect can comprise a printed motif illustrative of a type of flooring décor (e.g. hardwood, tile, stone etc.). The decorative effect may be provided by one or more processes including rotogravure or digital print technology.

Numerous alterations of the structure herein disclosed will suggest themselves to those skilled in the art. However, it is to be understood that the present disclosure relates to the preferred embodiment of the invention which is for purposes of illustration only and not to be construed as a limitation of the invention. All such modifications which do not depart from the spirit of the invention are intended to be included within the scope of the appended claims.

We claim:

1. A composite panel comprising:
   a rigid core comprising magnesium oxide, magnesium salt, and fibers;
   a decor layer bonded to the rigid core, the decor layer composed of a paper impregnated with a melamine resin and comprising abrasion-resistant particles;
   a protective layer disposed over the decor layer and comprising another paper impregnated with melamine resin, wherein the decor layer and the protective layer are directly laminated to the rigid core; and
   a balancing layer composed of a paper impregnated with a melamine resin, the balancing layer disposed below the rigid core;
   wherein corresponding overlapping portions of the decor layer and the rigid core are embossed, thus forming a three-dimensional texture on an exterior surface of the composite panel, and
   wherein the rigid core comprises:
   (i) at least 10% by weight and less than 40% by weight of magnesium oxide,
   (ii) 5-34% by weight of magnesium salt, and
   (iii) 20-50% by weight of fibers.

2. The composite panel of claim 1, further comprising a cushioning layer disposed below the balancing layer.

3. The composite panel of claim 1, wherein the fibers are natural fibers, polymer fibers, synthetic fibers, or a combination of one or more of natural fibers, polymer fibers, and synthetic fibers.

4. The composite panel of claim 1, wherein the rigid core has a flexural strength of greater than or equal to 200N when measured according to ASTM D1037.

5. The composite panel of claim 1, wherein the rigid core has a thickness of about 3 mm to about 15 mm.

6. The composite panel of claim 1, wherein the magnesium salt comprises magnesium chloride or magnesium sulfate.

7. The composite panel of claim 1, wherein the dimensional stability of the composite panel is between 0.1% and 0.25% when heated to a temperature of about 70° C. for 6 hours and then cooled to ambient temperature.

8. The composite panel of claim 1, wherein the content of melamine resin in the decor layer is from 30 g/m² to 180 g/m².

9. The composite panel of claim 1, wherein the decor layer is further impregnated with an adhesive.

10. The composite panel of claim 1, wherein the composite panel is one of a wall panel, a ceiling panel, or a floor panel.

11. The composite panel of claim 1, wherein the composite panel comprises an edge locking system.

12. The composite panel of claim 1, wherein the composite panel comprises a pressed bevel formed along the edges of the composite panel, and wherein the pressed bevel extending into the rigid core.

13. A composite panel comprising:
a protective layer composed of a paper impregnated with a melamine resin;
a decor layer disposed below the protective layer; and
a rigid core comprising magnesium oxide, magnesium salt, and fibers;
wherein the protective layer and the decor layer are directly laminated to the rigid core;
wherein corresponding overlapping portions of the protective layer, decor layer, and rigid core are embossed, thus forming a three-dimensional texture on an exterior surface of the composite panel, and
wherein the rigid core comprises:
(i) at least 10% by weight and less than 40% by weight of magnesium oxide,
(ii) 5-34% by weight of magnesium salt, and
(iii) 20-50% by weight of fibers.

14. The composite panel of claim 13, wherein the protective layer is further impregnated with an adhesive.

15. The composite panel of claim 13, wherein the decor layer comprises another paper impregnated with melamine resin, a thermoplastic film, a polymer film, or a wood veneer.

16. The composite panel of claim 13, wherein the decor layer is attached to the rigid core using an adhesive.

17. The composite panel of claim 13, wherein the rigid core is formed using a dry process or a wet process.

18. A composite panel comprising:
a protective layer composed of a paper impregnated with a melamine resin;
a decor layer disposed below the protective layer; and
a rigid core comprising magnesium oxide, magnesium salt, and fibers;
wherein the protective layer and the decor layer are directly laminated to the rigid core;
wherein corresponding overlapping portions of the protective layer, decor layer, and rigid core are embossed, thus forming a three-dimensional texture on an exterior surface of the composite panel, and
wherein the rigid core comprises:
(i) at least 10% by weight and less than 40% by weight of magnesium oxide,
(ii) 5-34% by weight of magnesium salt, and
(iii) 20-50% by weight of fibers,
wherein the rigid core comprises at least 10% of 5-phase crystals, and wherein the rigid core has a three-point bend strength greater than 200N.

19. A composite panel comprising:
a rigid core comprising magnesium oxide, magnesium salt, and fibers and having a three-point bend strength greater than 300N;
a decor layer bonded to the rigid core, the decor layer composed of a paper impregnated with a melamine resin; and
a protective layer disposed over the decor layer and comprising another paper impregnated with melamine resin, wherein the decor layer and the protective layer are directly laminated to the rigid core,
wherein the rigid core comprises:
(i) at least 10% by weight and less than 40% by weight of magnesium oxide,
(ii) 5-40% by weight of magnesium salt, and
(iii) 20-50% by weight of fibers,
wherein the magnesium salt comprises at least one of magnesium chloride or magnesium sulfate,
wherein the fibers are cellulose fibers,
wherein the rigid core comprises a coupling profile formed at one or more edges of the rigid core, the coupling profile comprising an edge locking system configured to securely couple the composite panel with another composite panel,
wherein the edge locking system comprises a click locking system that is configured to produce an auditory cue when the composite panels is coupled to the other composite panel, and
wherein the composite panel comprises a decorative floor covering panel.

20. The composite panel of claim 19, wherein the composite panel comprises a pressed bevel formed along the edges thereof, and wherein the pressed bevel extends into the rigid core.

21. The composite panel of claim 19, wherein the rigid core is formed using a dry process or a wet process.

22. A composite panel comprising:
a rigid core comprising magnesium oxide, magnesium salt, and fibers,
wherein the rigid core comprises:
(i) at least 10% by weight and less than 40% by weight of magnesium oxide,
(ii) 5-34% by weight of magnesium salt, and
(iii) 20-50% by weight of fibers,
wherein the magnesium salt comprises at least one of magnesium chloride or magnesium sulfate,
wherein the fibers are natural fibers, and
wherein the rigid core comprises a coupling profile formed at one or more edges of the rigid core, the coupling profile comprising an edge locking system configured to securely couple the composite panel with another composite panel,
wherein the rigid core comprises at least 10% of 5-phase crystals;
a decor layer bonded to the rigid core;
a protective layer disposed over the decor layer; wherein the decor layer and the protective layer are directly laminated to the rigid core;
a balancing layer disposed below the rigid core.

23. The composite panel of claim 22, wherein the decor layer is a thermoplastic film, a polymer film, a paper impregnated with melamine resin, or a veneer.

24. The composite panel of claim 22, wherein the decor layer is digitally printed on the rigid core.

25. The composite panel of claim 22, wherein the edge locking system comprises a click locking system.

26. A composite panel comprising:
- a rigid core comprising magnesium oxide, magnesium salt, and fibers; and
- a decor layer bonded to the rigid core, the decor layer composed of a paper impregnated with a melamine resin;
- a protective layer disposed above the decor layer and comprising paper impregnated with melamine resin, wherein the decor layer and the protective layer are directly laminated to the rigid core,
- wherein the rigid core comprises:
    (i) 10-39% by weight of magnesium oxide,
    (ii) 5-34% by weight of magnesium salt, and
    (iii) 20-50% by weight of fibers, and
- wherein the composite panel further comprises at least one of:
    an upper sublayer disposed between the rigid core and the decor layer, the upper sublayer configured to provide comfort underfoot and comprising one of cork, EVA, polypropylene, polyurethane, or PET;
    a bottom sublayer disposed below the rigid core and between the rigid core and a balancing layer composed of a paper impregnated with a melamine resin, the bottom sublayer comprising one of cork, EVA, polypropylene, polyurethane, or PET; and
    a soft acoustic layer disposed between the rigid core and the decor layer, the soft acoustic layer configured to dampen sound and comprising one of cork, polyvinyl chloride, or rubber.

27. The composite panel of claim 26, wherein the magnesium salt comprises magnesium chloride or magnesium sulfate, and wherein the fibers are natural fibers.

28. The composite panel of claim 26, further comprising a balancing layer composed of a paper impregnated with a melamine resin, the balancing layer disposed below the rigid core.

* * * * *